(12) United States Patent
Raynolds et al.

(10) Patent No.: US 6,201,048 B1
(45) Date of Patent: *Mar. 13, 2001

(54) STABLE WATERBORNE POLYMER COMPOSITIONS CONTAINING POLY (ALKYLENEIMINES)

(75) Inventors: Peter Webb Raynolds; Duane Allan Scott, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/023,522

(22) Filed: Feb. 13, 1998

Related U.S. Application Data

(60) Provisional application No. 60/064,274, filed on Sep. 18, 1997.

(51) Int. Cl.[7] .............................. C08J 3/20; C08K 5/521
(52) U.S. Cl. ........................................... 524/147; 524/558
(58) Field of Search ..................................... 524/558, 147

(56) References Cited

U.S. PATENT DOCUMENTS

| | | |
|---|---|---|
| 4,980,404 | 12/1990 | Aydin et al. . |
| 5,296,530 | 3/1994 | Bors et al. . |
| 5,484,975 | 1/1996 | Itatsu . |
| 5,498,659 | 3/1996 | Esser . |
| 5,525,662 | 6/1996 | Lavole et al. . |
| 5,770,650 * | 6/1998 | McGee et al. ..................... 524/590 |
| 5,783,626 * | 7/1998 | Taylor et al. ..................... 524/555 |
| 5,891,950 * | 4/1999 | Collins et al. ..................... 524/502 |
| 5,990,224 * | 11/1999 | Raynolds et al. ..................... 524/501 |

FOREIGN PATENT DOCUMENTS

| | | |
|---|---|---|
| 6-121171 | 4/1994 | (JP) . |
| WO 96 22338 | 7/1996 | (WO) . |
| WO 97 45468 | 12/1997 | (WO) . |

* cited by examiner

*Primary Examiner*—Ana Woodward
(74) *Attorney, Agent, or Firm*—Rose M. Allen; Harry J. Gwinnell

(57) ABSTRACT

This invention provides waterborne polymer compositions stabilized against gelling due to the addition of a poly (alkylenimine) by post addition of certain anionic surfactants. The waterborne polymer compositions of the invention are useful in a variety of coating formulations such as, for example, paints, inks, sealants, textile back coatings, adhesives and the like. Methods of making stable waterborne polymer compositions are also disclosed.

12 Claims, No Drawings

STABLE WATERBORNE POLYMER COMPOSITIONS CONTAINING POLY (ALKYLENEIMINES)

This application claims the benefit of Provisional No. 60/064,274 filed Sep. 18, 1997.

FIELD OF THE INVENTION

This invention belongs to the field of emulsion chemistry. In particular, it relates to stable waterborne polymer compositions useful in a variety of coating formulations.

BACKGROUND OF THE INVENTION

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Pat. No. 61-21171 describes a fast-curing adhesive of two separate liquids. The first liquid is an aqueous solution and/or aqueous emulsion of a polymer compound containing an acetoacetyl group. The second liquid consists of polyethylenimine.

Even with current waterborne polymer formulations, a need remains for improved aqueous coating compositions and waterborne polymers for use in those compositions. In particular, a need exists for waterborne polymer compositions which may formulate as a single, stable composition but which undergo crosslinking upon film formation imparting one or more desired properties to the resulting coating. The present invention meets such needs.

SUMMARY OF THE INVENTION

This invention provides stable waterborne polymer compositions which are stabilized against gelling upon addition of a poly(alkylenimine), preferably by post polymerization addition of certain anionic surfactants. These stable waterborne polymer compositions are useful in a variety of coating formulations such as, for example, paints, inks, sealants, and adhesives. When used in coating formulations, the stable waterborne polymer compositions of the invention provide adhesion and crosslinking in the final film or coating. The film or coating may be cured at ambient temperatures or may be thermally cured. Methods of preparing stable waterborne polymer compositions are also disclosed, along with methods of stabilizing latex compositions against gelling upon addition of a poly(alkylenimine).

DETAILED DESCRIPTION OF THE INVENTION

The present invention provides stable waterborne polymer compositions, that is compositions containing a polymer and water. Waterborne polymer compositions include, but are not limited to, latexes, dispersions, microemulsions, or suspensions. Waterborne polymer compositions of the present invention are stable and may be stored at room temperature or moderately above room temperature (e.g., about 50 to 60° C.) and provide adhesion and crosslinking upon film formation when applied to a substrate. Yet, a film or coating formed with polymers of the invention may be cured at room temperature (ambient cure) or at elevated temperatures (thermal cure).

The polymers used to prepare the waterborne polymer composition of the present invention are generally prepared as particles. The particles may be structured or unstructured. Structured particles include, but are not limited to, core/shell particles and gradient particles. The average polymer particle size may range from about 25 to about 600 nm.

The polymer particles generally have a spherical shape. In one embodiment, the generally spherical polymeric particle may have a core portion and a shell portion. The core/shell polymer particles may also be prepared in a multilobe form, a peanut shell, an acorn form, or a raspberry form. It is further preferred in such particles that the core portion comprises about 20 to about 80 of the total weight of said particle and the shell portion comprises about 80 to about 20 of the total weight volume of the particle.

Although the following description will be directed to a discussion of specific types of polymers, other waterborne latex polymers that are susceptible to gelling upon addition of a poly(alkylenimine) are within the scope of the present invention.

Enamine-functional polymers represent a preferred embodiment of polymers used to form the stable waterborne polymer compositions of the present invention. Enamine-functional polymers may be prepared by reacting a polymer having acetoacetoxy groups with ammonia or a primary or secondary amine. The primary or secondary amine may be a monoamine compound or a polyamine compound. Preferred amines include, for example, triaminononane, H$_2$N(CH$_2$)$_3$CH(CH$_2$NH$_2$)(CH$_2$)$_4$NH$_2$ (CAS Registry No. 1572-55-0), available from Monsanto; 2-amino-2-methyl-1-propanol available as AMP-95 product from Angus Chemical Company, Buffalo Grove, Ill.; or, as described below, polyethylenimine, (PEI). In water-based latexes, the enamine functionality serves to further stabilize the acetoacetoxy-groups and protect them from hydrolysis. Enamine-functional polymers have been described in Moszner et al., Polymer Bulletin 32, 419–426 (1994); European patent Application No. 0 492 847 A2; U.S. Pat. No. 5,296,530; and U.S. Pat. No. 5,484,849. These documents are incorporated herein by reference.

Acetoacetoxy-type functional polymers useable in the present invention may be prepared by free radical emulsion polymerization of vinyl monomers having an acetoacetoxy functionality such as those of Formula (I) below with other vinyl monomers. This combination of monomers provides water-based dispersion of polymer particles where the polymer has pendant acetoacetoxy groups. As used here, a "vinyl" monomer is an ethylenically unsaturated monomer. A pendant acetoacetoxy group is not strictly limited to those at the termini of the polymer. Pendant acetoacetoxy groups also include groups attached to the polymer's backbone and available for further reaction.

Acetoacetoxy-type functional polymers preferably contain about 0.5 to about 30 weight percent of vinyl monomers having acetoacetoxy-type functionality such as those of Formula I, and about 99.5 to about 70 weight percent of other vinyl monomers, preferably alkyl (meth)acrylates having 1 to 18 carbons. The weight percentage is based on the total amount of monomers in the composition. More preferably, the stabilized polymer has about 1 to about 15 weight percent acetoacetoxy monomers, and about 99 to about 85 weight percent of other vinyl monomers.

Aspects of this emulsion polymerization and preferred embodiments are discussed below beginning with vinyl monomers as in Formula (I) which have an acetoacetoxy-type functionality.

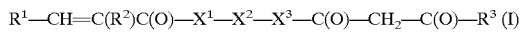

R$^1$—CH=C(R$^2$)C(O)—X$^1$—X$^2$—X$^3$—C(O)—CH$_2$—C(O)—R$^3$ (I)

For an acetoacetoxy-type monomer of Formula (1), R$^1$ is a hydrogen or halogen. R$^2$ is a hydrogen, halogen, C$_1$–C$_6$ alkylthio group, or C$_1$–C$_6$ alkyl group. R$^3$ is a C$_1$–C$_6$ alkyl group. X$^1$ and X$^3$ are independently O, S, or a group of the formula —N(R')—, where R' is a C$_1$–C$_6$ alkyl group. X$^2$ is a C$_2$–C$_{12}$ alkylene group or C$_3$–C$_{12}$ cycloalkylene group. The alkyl and alkylene groups described here and throughout the specification may be straight or branched groups. Preferred monomers of Formula (I) are acetoacetoxyethyl methacrylate, acetoacetoxyethyl acrylate, acetoacetoxy (methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (I).

Suitable other vinyl monomers which may be reacted with the vinyl monomers having acetoacetoxy-type functionality include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; ethylhexyl methacrylate; octyl acrylate; octyl methacrylate; styrene; -methyl styrene; glycidyl methacrylate; carbodiimide methacrylate; C$_1$–C$_{18}$ alkyl crotonates; di-n-butyl maleate; dioctylmaleate; allyl methacrylate; di-allyl maleate; di-allylmalonate; methoxy-butenyl methacrylate; isobornyl methacrylate; hydroxybutenyl methacrylate; hydroxyethyl (meth)acrylate; hydroxypropyl (meth)acrylate; acrylonitrile, vinyl chloride; ethylene; methacrylamide; acrylamide; butyl acrylamide; ethyl acrylamide; vinyl (meth)acrylate; isopropenyl (meth)-acrylate; cycloaliphatic epoxy (meth)acrylates; and ethylformamide. Such monomers are described in "The Brandon Worldwide Monomer Reference Guide and Sourcebook" Second Edition, 1992, Brandon Associates, Merrimack, New Hampshire; and in "Polymers and Monomers", the 1996–1997 Catalog from Polyscience, Inc., Warrington, Pa.

Vinyl esters of the general Formula (II) represent further examples of useful other vinyl monomers:

RCH=CH—O—C(O)—C(R)$_3$ (II)

In Formula (II), R is independently hydrogen or an alkyl group of up to 12 carbon atoms. Particular monomers of Formula (II) include CH$_2$=CH—O—C(O)—CH$_3$, CH$_2$=CH—O—C(O)—C(CH$_3$)$_3$, CH$_2$=CH—O—C(O)—CH(C$_2$H$_5$)(C$_4$H$_9$), and CH$_2$=CH—O—C(O)—CH$_2$CH$_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

Optional monomers that may be incorporated into the polymer include styrene, butyl styrene, vinyl toluene, α-methyl styrene, (meth)acryl-amide, (meth)acrylonitirle, vinyl acetate, and vinyl esters of acids other than acetic acid, itaconic anhydride, maleic anhydride, vinyl formate, and salts of 2-sulfoethyl (meth)acrylate.

In one embodiment, the acetoacetoxy functional polymer may also incorporate nitrogen-containing, vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxyethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamido-ethyl)ethylene urea is available from Rhone-Poulenc under the WAM trade name.

Small amounts of acid vinyl monomers may also be used to prepare acetoacetoxy emulsion polymers according to the invention. Such acid vinyl monomers include, for example, acrylic acid, methacrylic acid, crotonic acid, itaconic acid, maleic acid, fumaric acid, and 2-acrylamido-2-methyl-1-propanesulfonic acid (sodium, potassium, or ammonium salts). Incorporating acid vinyl monomers into the stabilized polymer may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Larger amounts of acid vinyl monomers may be used to achieve a desired effect, such as increased viscosity.

The acetoacetoxy polymer may be prepared using emulsion polymerization techniques known in the art. The acetoacetoxy polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, catalysts, and surfactants known in the art of emulsion polymerization, may be used to prepare the polymers.

Chain transfer agents may optionally be added, in an amount up to about 2 weight percent based on total monomer content, to control the molecular weight of the polymer. Use of chain transfer agents may be preferred when it is desired to obtain low molecular weight polymers. Exemplary chain transfer agents are butyl mercaptan, mercaptopropionic acid, 2-ethylhexyl mercaptopropionate, dodecylmercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl mercaptopropionate and dodecylmercaptan represents preferred chain transfer agents.

Typical initiators include hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof. Peroxide-iron and peroxide-sulfite redox catalysts may also be used.

Crosslinking agents may optionally be added, in an amount up to about 2 weight percent, based on total monomer content, to control the molecular weight of the polymer. Use of crosslinking agents may be preferred when it is desired to obtain high molecular weight polymers. Useful crosslinkers include trimethylolpropane tri(meth)acrylate, 1,6-hexanediol di(meth)acrylate, allyl methacrylate and the like.

Any conventional polymerization surfactant may be used to form the polymer of the present invention. Useful surfactants include, but are not limited to, ionic and nonionic surfactants such as alkyl polyglycol ethers; alkyl phenol polyglycol ethers; alkali metal ammonium salts of alkyl, aryl or alkylaryl sulfonates, sulfates, phosphates, and the like, and reactive anionic or nonionic surfactants possessing styrene or allyl groups. Sulfonate containing surfactants such as sodium dodecyl benzene sulfonate, sodium dodecyl sulfate, or the diesters of sodiosulfosuccinic acid such as sodium dioctylsulfo-succinate, and alpha olefin sulfonates are suitable. When persulfate catalysts are used, in-situ generated oligomers with sulfate end groups may act as surfactants.

Although the above list of useful surfactants may include some of the same surfactants listed below for post-polymerization addition, incorporation of these particular surfactants into the polymerization process has not been found to stabilize the polymer against gelling upon addition of poly(alkylenimine) and upon adjusting the pH of the polymer.

The type and amount of surfactant used in the polymerization process depends on the specific composition, reaction conditions, and the desired final particle size, as is known in the art.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; alkali-soluble acrylic resins as described in U.S. Pat. No. 4,839,413; and hydroxyethyl cellulose, as described in U.S. Pat. No. 3,876,596 and British Patent No. 1,155,275.

The acetoacetoxy functionality in the polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives.

As discussed above, enamine-functional polymers may be prepared by addition of a primary or secondary amine to the acetoacetoxy polymer. Preferred amines are poly (alkyleneimines). Poly(alkylenimines) for use in the invention may have a weight average molecular weight of about 800 to about 750,000. The poly(alkylenimine) is preferably a polyethylenimine (PEI) and more preferably PEI having a weight average molecular weight of about 800 to about 25,000. The PEI may contain primary, secondary, and tertiary amine groups, for example, in a ratio of 1.5:1.4:1.0, respectively. Such PEI compounds are commercially available from BASF Corporation as LUPASOL™ G-35 polyethylenimine. Depending on the requirements of the end-use of the formulation, the content of polyethylenimine can vary from 0.5 to 25 weight percent based on the dry weight of the acetoacetoxy polymer. More preferably, the content of polyethylenimine can vary from 2 to 12 weight percent based on the dry weight of the acetoacetoxy polymer.

However, poly(alkylenimines), particularly polyethylenimine, are known to flocculate latexes, and are actually sold for that purpose. The pH of the prepared latex is normally greater than 11, much too high for many commercial applications. After addition of a poly (alkylenimine), upon adjustment of the pH of the latex to a pH of less than about 10, the latex normally gels.

It has been unexpectedly found that the thus formed enamine polymers may be stabilized against gelling due to the addition of poly(alkylenimine), by post polymerization addition of a surfactant. Preferably the surfactant is an anionic surfactant selected from salts of phosphate or sulfate esters of alkyl or alkylaryl ethoxylates containing at least five EO units. Useful anionic surfactants include, but are not limited to, ammonium, amine, sodium, potassium, and lithium salts of the above compounds such as ammonium salts of sulfated alkyl phenol ethoxylates, sodium napthalene sulfonate formaldehyde polymers, phosphated octyl phenol ethoxylates and aromatic phosphate esters. Preferred anionic surfactants for use in the present invention are Aerosol NPES 930P surfactant available from Cytech Industries, Daxad 19 surfactant available from W.R. Grace and Company, Triton QS-44 surfactant available from Union Carbide Corporation, and Maphos 6600 surfactant available from PPG Industries. In contrast to polymers that flocculate upon addition of a poly(alkylenimine), the addition of a poly (alkyleneimine), particularly polyethylenimine, to polymers to which these anionic surfactants has been added, does not cause flocculation, but provides a stable, waterborne polymer composition.

The addition of polyethylenimine may be accomplished by adding, with stirring, polyethylenimine to an emulsion of the acetoacetoxy polymer to which has also been added an anionic surfactant as described above. Sufficient surfactant should be added to stabilize the enamine polymer. Typically, the surfactant may be added in an amount of from about 0.5 phr to about 5 phr based on dry polymer weight. Optionally, the surfactant may be added, with stirring, with the polyethylenimine or after addition of the poly(ethyleneimine); but prior to adjusting the pH of the polymer. Other surfactants and property modifying ingredients may also be added that do not impact on the stability of the waterborne composition.

The pH of the stable waterborne enamine polymer of the invention may then be adjusted by the addition of an acid or buffer. For example, buffers such as sodium bicarbonate, ammonium bicarbonate, ammonium dihydrogenphosphate, an ammonium polyacrylate, or a mixture of such buffers may be used. The buffer, such as ammonium bicarbonate, may generally be added to the stable, waterborne enamine polymer to adjust and/or buffer the pH of the composition to less than about 10. Waterborne enamine polymer compositions having pH values in the range of about 7.0 to about 9.8, preferably about 8.4 to about 9.2, may be achieved using ammonium buffers. Buffered compositions of the invention are particularly useful in coating formulations.

The stable enamine polymers of the present invention will vary in properties, depending on the end-use application. In general, the polymer composition may have a second cycle glass transition temperature (Tg) of −50 to +100° C.; more preferably, −35 to +50° C.

The weight average molecular weight of the stable enamine polymers may vary from about 20,000 to 5,000,000 daltons; more preferably from 100,000 to 2,000,000 and most preferably from 200,000 to 1,000,000. The molecular weight range may be controlled by reaction conditions, as is known in the art, or by the use of a chain transfer agent or crosslinkers, as discussed above.

A waterborne polymer composition of the invention may also contain other additives known in those compositions and may use other emulsion polymerization methodology. U.S. Pat. No. 5,371,148 provides a good description of possible additives and is incorporated herein by reference.

In a waterborne composition of the invention, the stable acetoacetoxy-functional, or enamine-functional polymers, may be present from about 5 to about 60 weight percent based on dry resin and more preferably from about 25 to about 55 weight percent. The examples below illustrate the preparation of polymers and water-based compositions according to the invention.

Latexes or other water-based compositions containing small particle size polymers, those ranging from about 25 to about 100 nm and more preferably from about 45 to about 85 nm, represent one preferred embodiment of the invention.

The stable polymers and waterborne polymer compositions of the invention are useful in a variety of coating formulations such as architectural coatings, metal coatings, wood coatings, plastic coatings, textile coatings, cementitious coatings, paper coatings, inks, and adhesive. Examples of such coating formulations adapted for particular uses include, but are not limited to, corrosion inhibitors, concrete coatings, maintenance coatings, latex paints, industrial coatings, automotive coatings, textile back coatings, surface printing inks and laminating inks. Accordingly, the present invention relates to such coating formulations containing a waterborne polymer composition of the invention, preferably a water-based latex. The polymers and waterborne polymer compositions of the invention may be incorporated in those coating formulations in the same manner as known polymer latexes and used with the conventional components and or additives of such compositions. The coating formulations may be clear or pigmented. With their crosslinking ability, adhesion properties, and resistance properties, the water-based latexes of the invention impart new and/or improved properties to the various coating formulations.

Upon formulation, a coating formulation containing a stable polymer or waterborne polymer composition of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coating may be dried by heating but preferably is allowed to air dry. Advantageously, a coating employing a polymer of the invention may be thermally or ambiently cured. As a further aspect, the present invention relates to a shaped or formed article which has been coated with a coating formulations of the present invention.

A waterborne polymer composition according to the invention may comprise the stabilized polymer of the invention and water, along with a solvent, a pigment (organic or inorganic) and/or other additives and fillers known in the art, and enumerated below. When a solvent is used, watermiscible solvents are preferred. A latex paint composition of the invention may comprise a waterborne polymer composition of the invention, a pigment and one or more additives or fillers used in latex paints.

Additives or fillers used in formulating coatings include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, published by the National Paint & Coatings Association, 1500 Rhode Island Avenue, NW, Washington, D.C. 20005.

A polymer or waterborne polymer composition of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, polymers having pendant allyl groups such as described in U.S. Pat. No. 5,539,073, styrene-butadiene polymers, vinylacetateethylene copolymers, and the like.

The following examples are intended to illustrate, not limit, the invention:

EXAMPLES

Example 1

Latex Synthesis:

The reactor configuration was a 4 liter jacketed kettle held at 80° C. with circulating water. Deionized water was used and the atmosphere above the reaction was inerted with nitrogen. The reactor was charged with 1000 g water, 3 g of sodium bicarbonate and 54.5 g (1.5 phm) of Rhodacal A246L surfactant (a $C_{12,14}$ alpha olefin sodium sulfonate surfactant available from Rhone-Poulenc as a 38.5% solution in water), and heated to 80° C. An emulsion was made with 700 g of water, 10.9 g (0.3 phm) of Rhodacal A246L surfactant, 672 g of styrene, 476 g of butyl acrylate, 70 g of 2-hydroxyethyl methacrylate (HEMA), 140 g of acetoacetoxyethyl methacrylate (AAEM) and 84 g of sodium 2-acrylamido-2-methylpropane sulfonate (AMPS 2405 monomer, available from Lubrizol Corporation as a 50% solution in water). To the reactor was added 110 g of the above emulsion, followed by a solution of 2.7 g of sodium persulfate in 20 g of water. After 5 minutes, the remainder of the emulsion was fed to the reactor over a 2 hour period. At the same time a solution of 1.5 g of sodium persulfate in 50 g of water was added to the reactor over a 1 hour period. The reaction mixture was held at 80° C. for 30 minutes after addition was complete, and the reactor was then cooled. As the reactor was cooled, a solution of 1.5 g of t-butylhydroperoxide in 30 g of water was added rapidly through the emulsion feed, and a solution of 1.5 g of sodium metabisulfite, 1.0 g of 50% sodium hydroxide solution and 80 g of water was added over 30 minutes. The pH of the latex was 7.36, particle size was 74 nm, and had 42.1 % solids.

Addition of PEI:

A mixture of 336 g of a 40% solution of LUPASOL™ G-35 polyethylenimine (a 50% solids product of BASF) in water, 60 g of Aerosol NPES 930P surfactant (available from Cytech Industries), and 84 g of water was added to the reactor over 30 minutes with a sub-surface feed. The pH of the latex was 11.2 and the particle size was 81 nm.

pH Adjustment

After 15 minutes a solution of 5% ammonium carbonate and 15% ammonium bicarbonate in water was added (550 g) to achieve a pH of 9.84. The entire batch filtered rapidly through a 40 mm, 100 mesh stainless steel screen. The pH of the latex was 9.84, the particle size was 80 nm, and percent solids was 37.25%. This latex showed no significant thickening after 2 weeks at 60° C.

Example 2

Comparative Example 100 g of the latex similar of Example 1 was treated with the same proportion of PEI, but without post polymerization addition of Aerosol NPES 930P surfactant, adjusting the pH of the latex to 9.8 caused the mixture to gel within ten minutes.

Example 3

Evaluation of Various Anionic Surfactants

The latex of Example 1 was used to evaluate various anionic surfactants. To 3270 g of this latex was added 330 g of a 40% solution of LUPASOL™ G-35 polyethylenimine in water (a 50% solids product of BASF). The particle size of the latex was 80 nm.

This mixture was then blended with various anionic surfactants at the rate of 3 g of surfactant (active basis) per 100 g of polymer (dry basis) and pH adjusted to 9.8 with a solution of 5% ammonium carbonate and 15% ammonium bicarbonate. The viscosity of the product was estimated by hand over time. The results with various anionic surfactants are shown in Table 1.

TABLE 1

Anionic Surfactants

| Surfactant | Type | Class | RESULT UPON pH ADJUSTMENT to pH 9.8 |
|---|---|---|---|
| None (Ex. 2) | None | None | Gelled immediately |
| sodium dodecyl sulfate | alcohol sulfate | Anionic | Gelled immediately |
| sodium dodecylbenzene sulfonate | alkylbenzene sulfonate | Anionic | Gelled immediately |
| Aerosol ® OT-75 | sodium bis(2-ethylhexyl)sulfosuccinate | Anionic | Gelled immediately |
| Rhodapex CO-436 | ammonium salt of a sulfated alkyl phenol ethoxylate with 4 EO units | Anionic | Gelled immediately |
| Aerosol NPES 930P | ammonium salt of a sulfated alkyl phenol ethoxylate with 30 EO units | Anionic | Stable at 60° |
| Rhodacal ® A246L | alpha olefin sulfonate, sodium salt | Anionic | Gelled 10 minutes |
| potassium oleate | soap | Anionic | Gelled immediately |
| Igepon ® T-51 | Sodium N-methyl-N-oleoyl taurate | Anionic | Gelled immediately |
| DowFax 2A1 | Sodium dodecyl diphenyloxide disulfonate | Anionic | Gelled immediately |
| Daxad ® 19 | sodium naphthalene sulfonate-formaldehyde polymer | Anionic | Stable at 60° C. |
| Triton QS-44 | Phosphated octyl phenol ethoxylate | Anionic | Stable at 60° |
| Naxonac 600 | Alcohol ether phosphate | Anionic | Gelled 5 minutes |
| Naxonac 610 | Nonylphenol ester phosphate | Anionic | Gelled 5 minutes |
| Maphos 8135 | Aromatic phosphate ester | Anionic | Gelled 5 minutes |
| Maphos 60A | Aliphatic phosphate ester | Anionic | Gelled 15 minutes |
| Maphos 30 | Aliphatic phosphate ester | Anionic | Gelled 15 minutes |
| Maphos 6600 | Aromatic phosphate ester | Anionic | Stable at 60° |

What is claimed is:

1. A stable waterborne polymer composition comprising an acetoacetoxy polymer; a poly(alkylenimine); and an aromatic phosphate ester surfactant.

2. The stable waterborne polymer composition of claim 1 wherein said polymer comprises the reaction product of about 0.5 to about 30 weight percent of vinyl monomers having acetoacetoxy functionality and about 99.5 to about 70 weight percent of other vinyl monomers.

3. The stable waterborne polymer composition of claim 2 wherein said vinyl monomer having acetoacetoxy functionality is selected from the group consisting of acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth) acrylate, and acetoacetoxybutyl acrylate.

4. The stable waterborne polymer composition of claim 2 wherein said polymer further comprises up to about 2 weight percent of a chain transfer agent selected from the group consisting of butyl mercaptan, mercaptopropionic acid, 2-ethylhexyl mercaptopropionate, dodecylmercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, and crotyl mercaptoacetate; and up to about 2 weight percent of a crosslinking agent selected from the group consisting of trimethylol-propane tri(meth) acrylate, 1,6-hexanediol di(meth)acrylate, and allyl methacrylate.

5. The stable waterborne polymer composition of claim 1 wherein said poly(alkylenimine) is present in an amount from about 0.5 to about 25 weight percent based on the dry weight of the polymer.

6. The stable waterborne polymer composition of claim 1 wherein said poly(alkylenimine) is poly(ethyleneimine).

7. A coating formulation, selected from an architectural coating, a metal coating, a wood coating, a plastic coating, a textile coating, a cementitious coating, a paper coating, an ink, and an adhesive, comprising the stable waterborne polymer composition of claim 1 and at least one additive selected from a solvent, a pigment, a buffer, a leveling agent, a rheology agent, a curing agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anit-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a drying agent, a catalyst, a crosslinking agent, and a coalescing agent.

8. A method of making a stable waterborne polymer composition comprising polymerizing a vinyl monomer having an acetoacetoxy functionality with other vinyl monomers to form a polymer; adding a poly(alkylenimine) and an aromatic phosphate ester surfactant; and adjusting the pH of the waterborne polymer composition to less than about 10.

9. The method of claim 8 wherein said polymer comprises the reaction product of about 0.5 to about 30 weight percent of vinyl monomers having acetoacetoxy functionality and about 99.5 to about 70 weight percent of other vinyl monomers; said poly(alkylenimine) is polyethylenimine present in an amount from about 0.5 to about 25 weight percent based on the dry weight of the polymer; and the pH is adjusted in the range of from about 7.0 to about 9.8.

10. The method of claim 9 wherein said vinyl monomer having acetoacetoxy functionality is a vinyl monomer having an acetoacetoxy functionality of Formula (I):

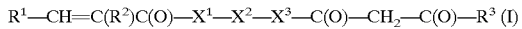

$$R^1\text{—}CH\text{=}C(R^2)C(O)\text{—}X^1\text{—}X^2\text{—}X^3\text{—}C(O)\text{—}CH_2\text{—}C(O)\text{—}R^3 \quad (I)$$

where $R^1$ is a hydrogen or halogen; $R^2$ is hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S or a group of the formula —N($R^1$)—, in which $R^1$ is a $C_1$–$C_6$ alkyl group; $X^2$ is a $C_1$–$C_6$ alkylene group or $C_3$–$C_2$ cycloalkylene group.

11. The method of claim 9 wherein said vinyl monomer having acetoacetoxy functionality is selected from the group consisting of acetoacetoxy-ethyl methacrylate, acetoacetoxyethyl acrylate, acetoacetoxy(methyl)ethyl acrylate, acetoacetoxypropyl acrylate, allyl acetoacetate, acetoacetamidoethyl (meth)acrylate, and acetoacetoxylbutyl acrylate.

12. The method of claim 8 wherein said polymerizing further occurs in the presence of up to about 2 weight percent of a chain transfer agent selected from the group consisting of butyl mercaptan, mercaptopropionic acid, 2-ethylhexyl mercaptopropionate, dodecylmercaptan, n-butyl mercapto-propionate, octyl mercaptan, isodecyl mercaptan, octadecyl mercaptan, mercaptoacetic acid, allyl mercaptopropionate, allyl mercaptoacetate, crotyl mercaptopropionate, and crotyl mercaptoacetate; and up to about 2 weight percent of a crosslinking agent selected from the group consisting of trimethylol-propane tri(meth) acrylate, 1,6-hexanediol di(meth)acrylate, and allyl methacrylate.

* * * * *